US012759578B2

(12) United States Patent
Ohsugi et al.

(10) Patent No.: US 12,759,578 B2
(45) Date of Patent: Oct. 13, 2026

(54) AUTOMATED DRIVING SYSTEM

(71) Applicant: TOYOTA JIDOSHA KABUSHIKI KAISHA, Toyota (JP)

(72) Inventors: Masamichi Ohsugi, Sunto-gun Shizuoka-ken (JP); Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 18/761,889

(22) Filed: Jul. 2, 2024

(65) Prior Publication Data

US 2025/0018973 A1 Jan. 16, 2025

(30) Foreign Application Priority Data

Jul. 10, 2023 (JP) ................................. 2023-113080

(51) Int. Cl.
*B60W 60/00* (2020.01)
*B60W 50/06* (2006.01)

(52) U.S. Cl.
CPC .......... *B60W 60/001* (2020.02); *B60W 50/06* (2013.01); *B60W 2520/10* (2013.01); *B60W 2554/802* (2020.02)

(58) Field of Classification Search
CPC ............... B60W 60/001; B60W 50/06; B60W 2520/10; B60W 2554/802; B60W 50/038; B60W 2050/0027; B60W 2050/0292; B60W 2710/205; B60W 2720/10; B60W 2720/106; B60W 2754/30; B60W 60/00186; G07C 5/0841
See application file for complete search history.

(56) References Cited

U.S. PATENT DOCUMENTS

| | | | | |
|---|---|---|---|---|
| 2019/0225232 A1* | 7/2019 | Blau | ..................... | B60W 40/08 |
| 2020/0302233 A1 | 9/2020 | Iwasaki | | |
| 2022/0234588 A1* | 7/2022 | Szelest | ................... | G07C 5/008 |
| 2023/0063930 A1 | 3/2023 | Ichida et al. | | |

FOREIGN PATENT DOCUMENTS

| | | | | |
|---|---|---|---|---|
| JP | 2020-046728 A | 3/2020 | | |
| JP | 2021-174413 A | 11/2021 | | |
| KR | 20220092723 A * | 7/2022 | ......... | B60R 21/0136 |
| KR | 20230078044 A * | 6/2023 | ........... | H04L 9/3247 |
| WO | 2019/116423 A1 | 6/2019 | | |

OTHER PUBLICATIONS

English translation of KR 20230078044 A (Year: 2023).*
English Translation of KR 20220092723 A (Year: 2022).*

* cited by examiner

*Primary Examiner* — Ramya P Burgess
*Assistant Examiner* — Chanmin Park
(74) *Attorney, Agent, or Firm* — Dinsmore & Shohl LLP

(57) ABSTRACT

An automated driving system comprises one or more processors configured to perform automated driving control of a vehicle in accordance with a control parameter and one or more storage devices. The automated driving system stores log data related to the automated driving control in the one or more storage devices while performing the automated driving control. When a free capacity of the one or more storage devices is less than a threshold value, the automated driving system adjusts the control parameter to restrict traveling of the vehicle.

9 Claims, 5 Drawing Sheets

AUTOMATED DRIVING SYSTEM

CROSS-REFERENCE TO RELATED APPLICATION

The present disclosure claims priority to Japanese Patent Application No. 2023-113080, filed on Jul. 10, 2023, the contents of which application are incorporated herein by reference in their entirety.

TECHNICAL FIELD

The present disclosure relates to an automated driving system installed on a vehicle.

BACKGROUND ART

A technique of performing automated driving control of a vehicle by using a machine learning model is known. Patent Literature 1 discloses a method for collecting training data that can be used for training of a machine learning model. In addition, the following Patent Literatures 2 and 3 are documents showing the technical level of the present technical field.

LIST OF RELATED ART

Patent Literature 1: WO 2019116423 A1
Patent Literature 2: JP 2021174413 A
Patent Literature 3: JP 2020046728 A

SUMMARY

As a method for ex-post fact assessment of automated driving control of a vehicle, it is containable to store log data related to the automated driving control in an in-vehicle storage device. However, since the capacity of the in-vehicle storage device is limited, the capacity may be strained depending on the situation. If the capacity is strained, there is a possibility that necessary log data will not be able to be recorded.

An object of the present disclosure is, in view of the above problems, to provide a technique capable of suppressing the capacity of a storage device from being strained.

One aspect of the present disclosure is directed to an automated driving system.

The automated driving system comprises:

- one or more processors configured to perform automated driving control of a vehicle in accordance with a control parameter; and
- one or more storage devices.

The one or more processors are further configured to execute:

- storing log data related to the automated driving control in the one or more storage devices while performing the automated driving control; and
- when a free capacity of the one or more storage devices is less than a threshold value, adjusting the control parameter to restrict traveling of the vehicle.

According to the present disclosure, when the free capacity of the storage device is less than the threshold value, the control parameter is adjusted to restrict the traveling of the vehicle. This makes it possible to reduce the amount of log data stored in the storage device. In addition, it is possible to suppress the capacity of the storage device from being strained.

DETAILED DESCRIPTION

Hereinafter, embodiments will be described with reference to the drawings.

1. Automated Driving System

An automated driving system according to the present embodiment is installed in a vehicle and performs automated driving control of the vehicle.

Figure 1:
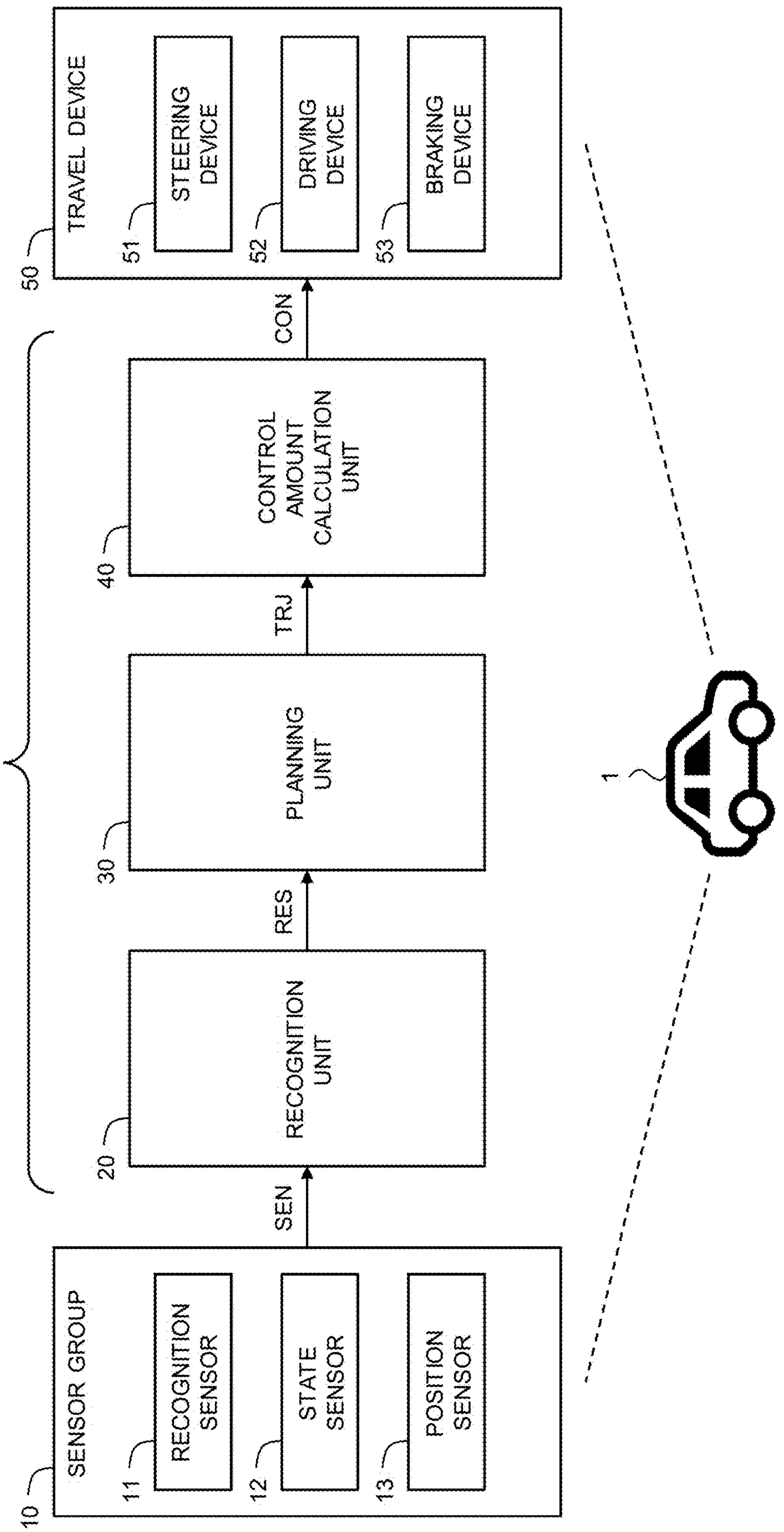
FIG. 1 is a diagram showing an example of a configuration related to automated driving control of a vehicle according to the present embodiment.

FIG. 1 is a diagram showing an example of a configuration related to automated driving control of a vehicle 1 by an automated driving system according to the present embodiment. The automated driving is to automatically perform at least one of steering, acceleration, and deceleration of the vehicle 1 without depending on a driving operation performed by an operator. The automated driving control is a concept including not only complete automated driving control but also risk avoidance control, lane keep assist control, and the like. The operator may be a driver on board the vehicle 1 or may be a remote operator who remotely operates the vehicle 1.

The vehicle 1 includes a sensor group 10, a recognition unit 20, a planning unit 30, a control amount calculation unit 40, and a travel device 50.

The sensor group 10 includes a recognition sensor 11 used for recognizing a situation around the vehicle 1. Examples of the recognition sensor 11 include a camera, a laser imaging detection and ranging (LIDAR), a radar, and the like. The sensor group 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, a steering angle sensor, and the like. As the position sensor 13, a global navigation satellite system (GNSS) sensor is exemplified.

Sensor detection information SEN is information acquired by the use of the sensor group 10. For example, the sensor detection information SEN includes image data captured (taken) by the camera. Alternatively, the sensor detection information SEN may include information (e.g., relative position, relative velocity, shape, and the like) regarding a specific object appearing in the image (e.g., a pedestrian, a preceding vehicle, a white line, a bicycle, a road sign, and the like). Also, for example, the sensor detection information SEN may include point group data acquired by the LIDAR. Also, for example, the sensor detection information SEN may include information on a relative position and a relative velocity of objects detected by the radar. The sensor detection information SEN may include vehicle state information indicating the state of the vehicle 1. The sensor detection information SEN may include position information indicating the position of the vehicle 1.

The recognition unit 20 receives the sensor detection information SEN. The recognition unit 20 recognizes a situation around the vehicle 1 based on the information acquired by the recognition sensor 11. For example, the recognition unit 20 recognizes the position of an object around the vehicle 1 on the special map. Examples of the object include a pedestrian, another vehicle (e.g., a preceding vehicle, a parked vehicle, and the like), a white line, a road structure (e.g., a guard rail, a curb, and the like), a fallen object, a traffic light, an intersection, a sign, and the like. Furthermore, the recognition unit 20 may perform prediction of the behavior of an object around the vehicle 1. Recognition result information RES indicates a result of recognition by the recognition unit 20.

The planning unit 30 receives the recognition result information RES from the recognition unit 20. In addition, the planning unit 30 may receive the vehicle state information, the position information, and map information generated in advance. The map information may be high-precision three-dimensional map information. The planning unit 30 generates a travel plan of the vehicle 1 based on the received information. The travel plan may be one for arriving at a destination set in advance. The travel plan may be one for avoiding a risk. The travel plan provides driving decisions such as, for example, maintaining a current travel lane, making a lane change, overtaking, making a right or left turn, steering, accelerating, decelerating, stopping, and the like. Further, the planning unit 30 generates a target trajectory TRJ required for the vehicle 1 to travel in accordance with the travel plan. The target trajectory TRJ includes a target position and a target velocity.

The control amount calculation unit 40 receives the target trajectory TRJ from the planning unit 30. The control amount calculation unit 40 calculates a control amount CON required for the vehicle 1 to follow the target trajectory TRJ. It can be also said that the control amount CON is a control amount required for reducing a deviation of the vehicle 1 from the target trajectory TRJ. The control amount CON includes at least one of a steering control amount, a driving control amount, and a braking control amount. Examples of the steering control amount include a target steering angle, a target steering torque, a target motor angle, a target motor drive current, and the like. Examples of the driving control amount include a target driving force, a target engine torque, and the like. Examples of the braking control amount include a target braking force, a target braking torque, and the like.

The travel device 50 includes a steering device 51, a driving device 52, and a braking device 53. The steering device 51 steers wheels of the vehicle 1. For example, the steering device 51 includes an electric power steering (EPS) device. The driving device 52 is a power source that generates a driving force. Examples of the driving device 52 include an engine, an electric motor, an in-wheel motor, and the like. The braking device 53 generates a braking force. The travel device 50 receives the control amount CON from the control amount calculation unit 40. The travel device 50 operates the steering device 51, the driving device 52, and the braking device 53 in accordance with the steering control amount, the driving control amount, and the braking control amount, respectively. Thus, the vehicle 1 travels so as to follow the target trajectory TRJ.

The recognition unit 20 includes at least one of a rule-based model and a machine learning model. The rule-based model performs the recognition process based on a predetermined rule group. Examples of the machine learning model include a neural network (NN), a support vector machine (SVM), a regression model, a decision tree model, and the like. The NN may be a convolutional neural network (CNN), a recurrent neural network (RNN), or a combination of CNN and RNN. The type of each layer, the number of layers, and the number of nodes in the NN are arbitrary. The machine learning model is generated in advance through machine learning. The recognition unit 20 performs the recognition process by inputting the sensor detection information SEN into the model. The recognition result information RES is output from the model or generated based on the output from the model.

Similarly, the planning unit 30 also includes at least one of a rule-based model and a machine learning model. The planning unit 30 performs the planning process by inputting the recognition result information RES into the model. The target trajectory TRJ is output from the model or generated based on the output from the model.

Similarly, the control amount calculation unit 40 also includes at least one of a rule-based model and a machine learning model. The control amount calculation unit 40 performs the control amount calculation process by inputting the target trajectory TRJ into the model. The control amount CON is output from the model or generated based on the output from the model.

Two or more of the recognition unit 20, the planning unit 30, and the control amount calculation unit 40 may have an integrated architecture. All of the recognition unit 20, the planning unit 30, and the control amount calculation unit 40 may have an integrated architecture (End-to-End architecture). For example, the recognition unit 20 and the planning unit 30 may have an integrated architecture that generates and outputs the target trajectory TRJ directly from the sensor detection information SEN. Even in the case of the integrated architecture, intermediate products such as the recognition result information RES and the target trajectory TRJ may be output. For example, in a case where the recognition unit 20 and the planning unit 30 have an integrated architecture based on a NN, the recognition result information RES may be an output from an intermediate layer of the NN.

The recognition unit 20, the planning unit 30, and the control amount calculation unit 40 constitute an "automated driving control unit" that controls the automated driving of the vehicle 1. The automated driving control unit has a control parameter related to the processing content for each of the recognition unit 20, the planning unit 30, and the control amount calculation unit 40. Examples of the control parameter related to the recognition unit 20 include a parameter for determining a type of an object to be recognized, a parameter for determining a range in which recognition is performed, a parameter for determining a prediction period of the prediction of behavior, and the like. Examples of the control parameter related to the planning unit 30 include a parameter for determining the maximum vehicle speed of the vehicle 1, a parameter for determining an inter-vehicle distance in the automated driving control, a parameter for determining a type of driving decisions given in a travel plan, and the like. Examples of the control parameter related to the control amount calculation unit 40 include a parameter for determining an upper limit of an acceleration, a deceleration, a steering angular acceleration, and the like of the vehicle 1.

The automated driving control unit performs the automated driving control of the vehicle 1 in accordance with the set control parameter. For example, the automated driving control unit switches models to function depending on the control parameter. Also, for example, the automated driving control unit is configured such that the model functions with reference to the control parameter.

Figure 2:
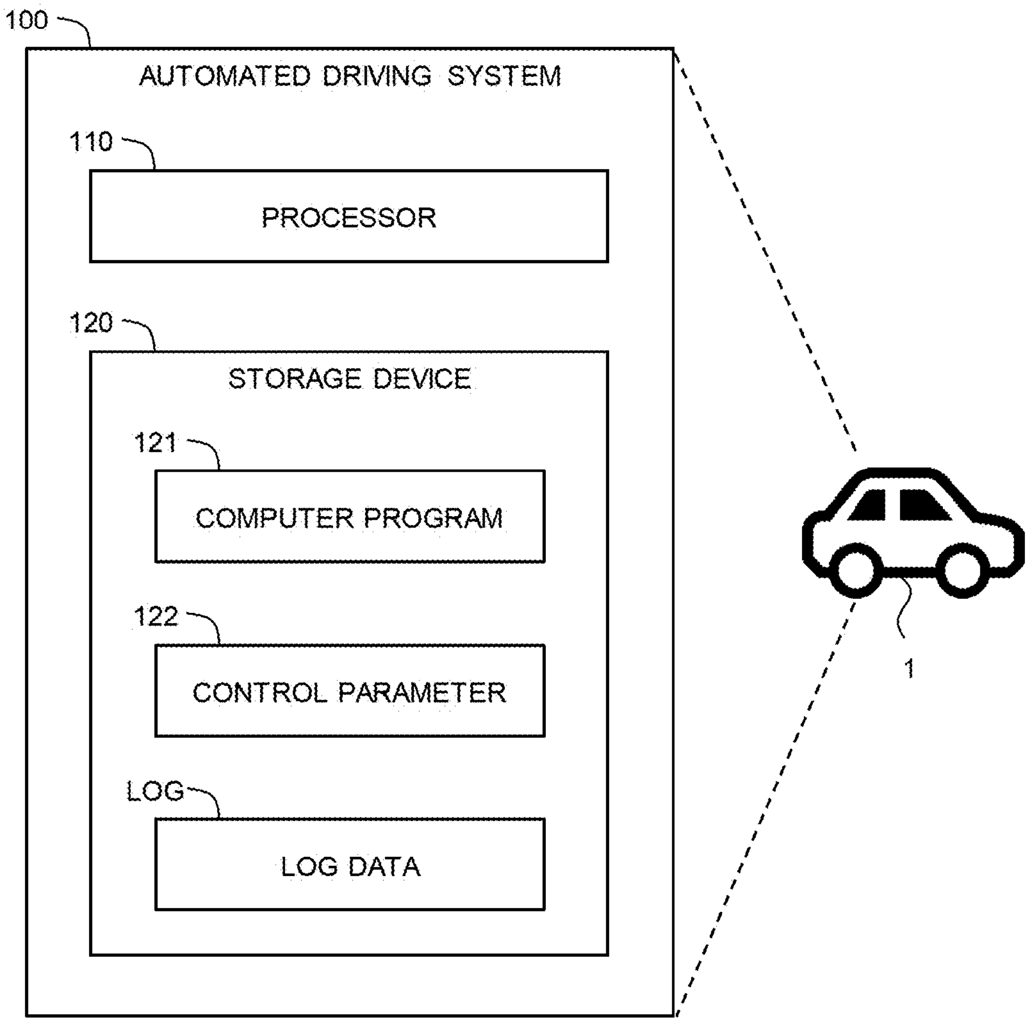
FIG. 2 is a diagram showing an example of a hardware configuration of an automated driving system according to the present embodiment.

FIG. 2 is a diagram showing an example of a hardware configuration of an automated driving system 100 according to the present embodiment. The automated driving system 100 has at least the function of the automated driving control unit described above. The automated driving system 100 may further include the sensor group 10 and the travel device 50.

The automated driving system 100 includes one or more processors 110 (hereinafter, simply referred to as a processor 110 or processing circuitry) and one or more storage devices 120 (hereinafter, simply referred to as a storage device 120).

The processor 110 executes a variety of processing. The processor 110 may be configured with a central processing unit (CPU), a graphics processing unit (GPU), an application specific integrated circuit (ASIC), a field-programmable gate array (FPGA), and the like. The storage device 120 stores a variety of information necessary for the processor 110 to execute processing. The storage device 120 may be configured with a read only memory (ROM), a random-access memory (RAM), a hard disk drive (HDD), a solid state drive (SSD), and the like.

The storage device 120 stores a computer program 121, a control parameter 122, and log data LOG.

A computer program 121 is executed by the processor 110. The variety of processing by the automated driving system 100 may be implemented by a cooperation of the processor 110 executing the computer program 121 and the storage device 120. In particular, a recognition unit 20, a planning unit 30, and a control amount calculation unit 40 may be implemented. In this case, the model included in the recognition unit 20, the planning unit 30, and the control amount calculation unit 40 may be a part of the computer program 121. The recognition unit 20, the planning unit 30, and the control amount calculation unit 40 may be implemented by a single processor 110 or may be respectively implemented by separate processors 110.

The control parameter 122 is a parameter related to the processing content of the automated driving control unit as described above. The processor 110 executes the computer program 121 with reference to the control parameter 122. Thereby, the automated driving control unit that performs automated driving control of the vehicle 1 in accordance with the control parameter 122 is realized.

While performing the automated driving control, the processor 110 acquires "log data LOG" related to the automated driving control. The processor 110 stores the acquired log data LOG in the storage device 120. It is expected that the stored log data LOG is used for verification of the automated driving control. The log data LOG may include the sensor detection information SEN that is input to the automated driving control unit. The log data LOG may include the control amount CON that is output from the automated driving control unit. The log data LOG may include the recognition result information RES that is output from the recognition unit 20. The log data LOG may include the target trajectory TRJ that is output from the planning unit 30. The log data LOG may include a reason for determination in the recognition process performed by the recognition unit 20. The log data LOG may include a reason for determination in the planning process performed by the planning unit 30. The log data LOG may include presence or absence of an operator's intervention in the automated driving control.

2. Adjustment of Control Parameter

As described above, in the automated driving system 100, the processor 110 stores the log data LOG related to the automated driving control in the storage device 120 for subsequent verification of the automated driving control. In order to appropriately verify the automated driving control in the event that some situation occurs, it is desirable that all stored log data LOG be retained until one process of autonomous driving is completed. However, the capacity of the storage device 120 provided in the vehicle 1 is limited. Therefore, the capacity may be strained depending on the situation of the automated driving control. If the capacity is strained, there is a possibility that necessary log data LOG will not be able to be recorded.

Therefore, in the automated driving system 100 according to the present embodiment, the processor 110 adjusts the control parameter to restrict the traveling of the vehicle 1 when the free capacity of the storage device 120 is less than a predetermined threshold value.

It is known that the amount of data in the log data LOG collected while performing the automated driving control is relatively small when the vehicle 1 is traveling steadily. But conversely, the amount of data in the log data LOG collected while performing the automated driving control becomes significantly larger when some event occurs in the automated driving control. This is because when an event occurs, data associated with the execution of processing corresponding to the event is collected as the log data LOG. Examples of the event that occurs in the automated driving control include when it is determined that it is necessary to avoid an object, when it is determined that it is necessary to operate a collision avoidance system, when it is determined that it is necessary to overtake a preceding vehicle, when it is determined that a lane change is necessary, and the like.

Such an event is considered to be more likely to occur as the change in the traveling state or the traveling environment of the vehicle 1 is larger. For example, when the vehicle 1 suddenly accelerates or suddenly steers, an event associated with the sudden appearance of a recognized object is more likely to occur. Therefore, by restricting the traveling of the vehicle 1, it is possible to suppress the occurrence of an event in which the amount of data in the log data LOG increases. The automated driving system 100 according to the present embodiment can suppress the capacity of the storage device 120 from being strained based on the above viewpoint.

Figure 3:
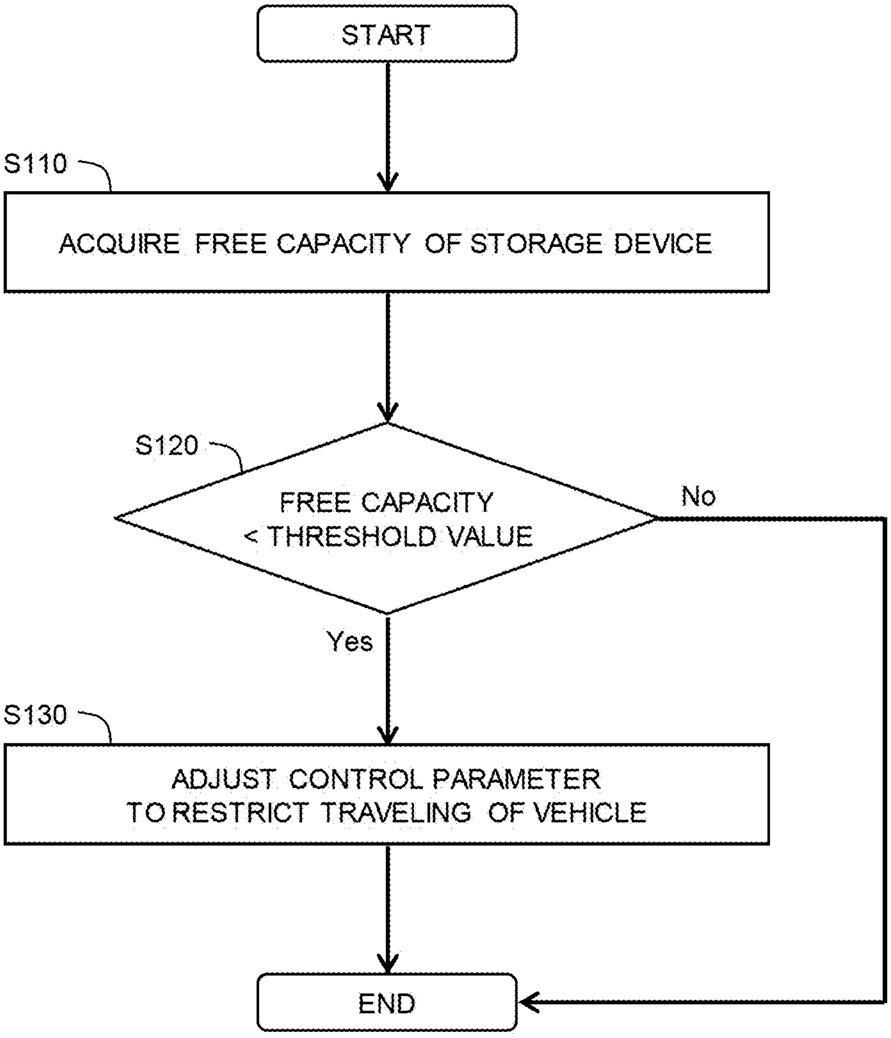
FIG. 3 is a flowchart showing processing executed by a processor according to the present embodiment.

FIG. 3 is a flowchart showing an example of processing executed by the processor 110. The processor 110 may be configured to repeatedly execute the processing according to the flowchart shown in FIG. 3 at a predetermined processing cycle while performing the automated driving control.

First, in step S110, the processor 110 acquires the free capacity of the storage device 120.

Next, in step S120, the processor 110 determines whether or not the free capacity of the storage device 120 is less than a predetermined threshold value. The threshold value may be set to, for example, a value at which it is expected that the log data LOG cannot be recorded if some event occurs. The processor 110 may be configured to change the threshold value depending on the expected traveling time or the traveling environment.

When the free capacity is equal to or greater than the threshold value (step S120; No), the processor 110 ends the current process without adjusting the control parameter 122. When the free capacity is less than the threshold value (step S120; Yes), the processing proceeds to step S130.

In step S130, the processor 110 adjusts the control parameter 122 to restrict the traveling of the vehicle 1. After step S130, the processor 110 ends the current process.

Regarding the adjustment of the control parameter 122, the following embodiments can be considered.

Figure 4A:
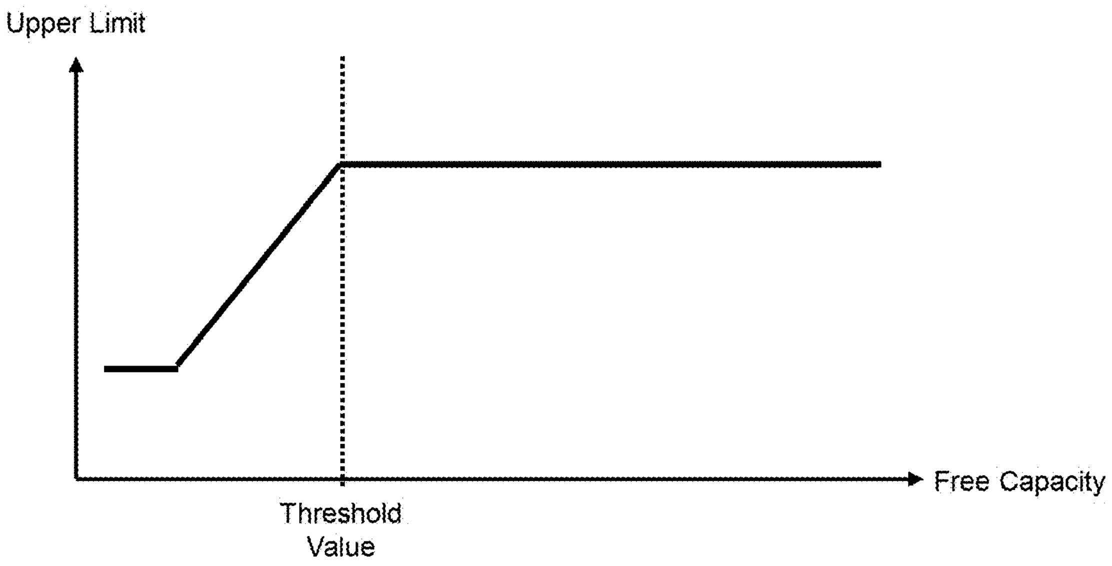
FIG. 4A is a diagram showing a first example of a map for adjusting a control parameter.

The first embodiment is to adjust a parameter that defines an upper limit of an acceleration or a steering angular acceleration of the vehicle 1. In this case, the processor 110 adjusts the control parameter 122 to decrease the upper limit depending on the free capacity of the storage device 120. In particular, the processor 110 may be configured to decrease the upper limit to be smaller as the free capacity decreases. The processor 110 may adjust the control parameter 122 according to a map that provides a set value of the upper limit with respect to the free capacity, for example. FIG. 4A is a diagram showing an example of a map for providing a set value of the upper limit with respect to the free capacity. According to the map shown in FIG. 4A, the processor 110 continuously decreases the set value of the upper limit as the free capacity decreases within a certain range in which the free capacity is less than the threshold value. However, the processor 110 may be configured to decrease the set value of the upper limit in a stepwise manner.

By decreasing the upper limit of the acceleration or the steering angular acceleration, it is possible to restrict the vehicle 1 from being suddenly accelerated or suddenly steered in the automated driving control. As a result, the occurrence of an event can be effectively suppressed.

The second embodiment is to adjust a parameter that determines a maximum vehicle speed of the vehicle 1. In this case, the processor 110 adjusts the control parameter 122 to decrease the maximum vehicle speed depending on the free capacity of the storage device 120. In particular, the processor 110 may be configured to decrease the upper limit to be smaller as the free capacity decreases. Similar to the first embodiment, the processor 110 may adjust the control parameter 122 according to a map for providing a set value of the maximum vehicle speed with respect to free capacity, for example.

By decreasing the maximum vehicle speed, the vehicle 1 can travel slowly in the automated driving control. As a result, the occurrence of an event can be effectively suppressed.

Figure 4B:
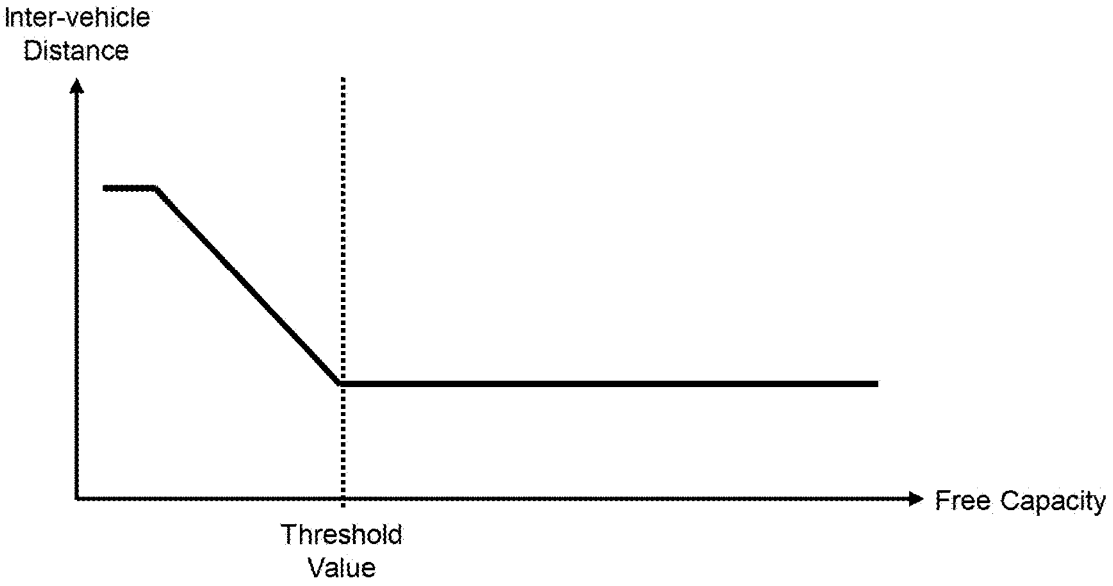
FIG. 4B is a diagram showing a second example of the map for adjusting the control parameter.

The third embodiment is to adjust a parameter that defines an inter-vehicle distance in the automated driving control. In this case, the processor 110 adjusts the control parameter 122 to increase the inter-vehicle distance depending on the free capacity of the storage device 120. In particular, the processor 110 may be configured to increase the inter-vehicle distance to be larger as the free capacity decreases. The processor 110 may adjust the control parameter 122 according to a map for providing a set value of the inter-vehicle distance with respect to the free capacity, for example. FIG. 4B is a diagram showing an example of a map for providing a set value of the inter-vehicle distance with respect to the free capacity. According to the map shown in FIG. 4B, the processor 110 continuously increases the set value of the inter-vehicle distance as the free capacity decreases in a certain range in which the free capacity is less than the threshold value. However, the processor 110 may be configured to increase the set value of the inter-vehicle distance in a stepwise manner.

By increasing the inter-vehicle distance, it is possible to allow the vehicle 1 to travel with a margin in the automated driving control. As a result, the occurrence of an event can be effectively suppressed.

3. Effect

As described above, according to the present embodiment, when the free capacity of the storage device 120 is less than the predetermined threshold value, the control parameter is adjusted to restrict the traveling of the vehicle 1. It is thus possible to suppress the occurrence of an event that increases the amount of data in the log data LOG. As a result, it is possible to suppress the capacity of the storage device 120 from being strained.

Figure 5:
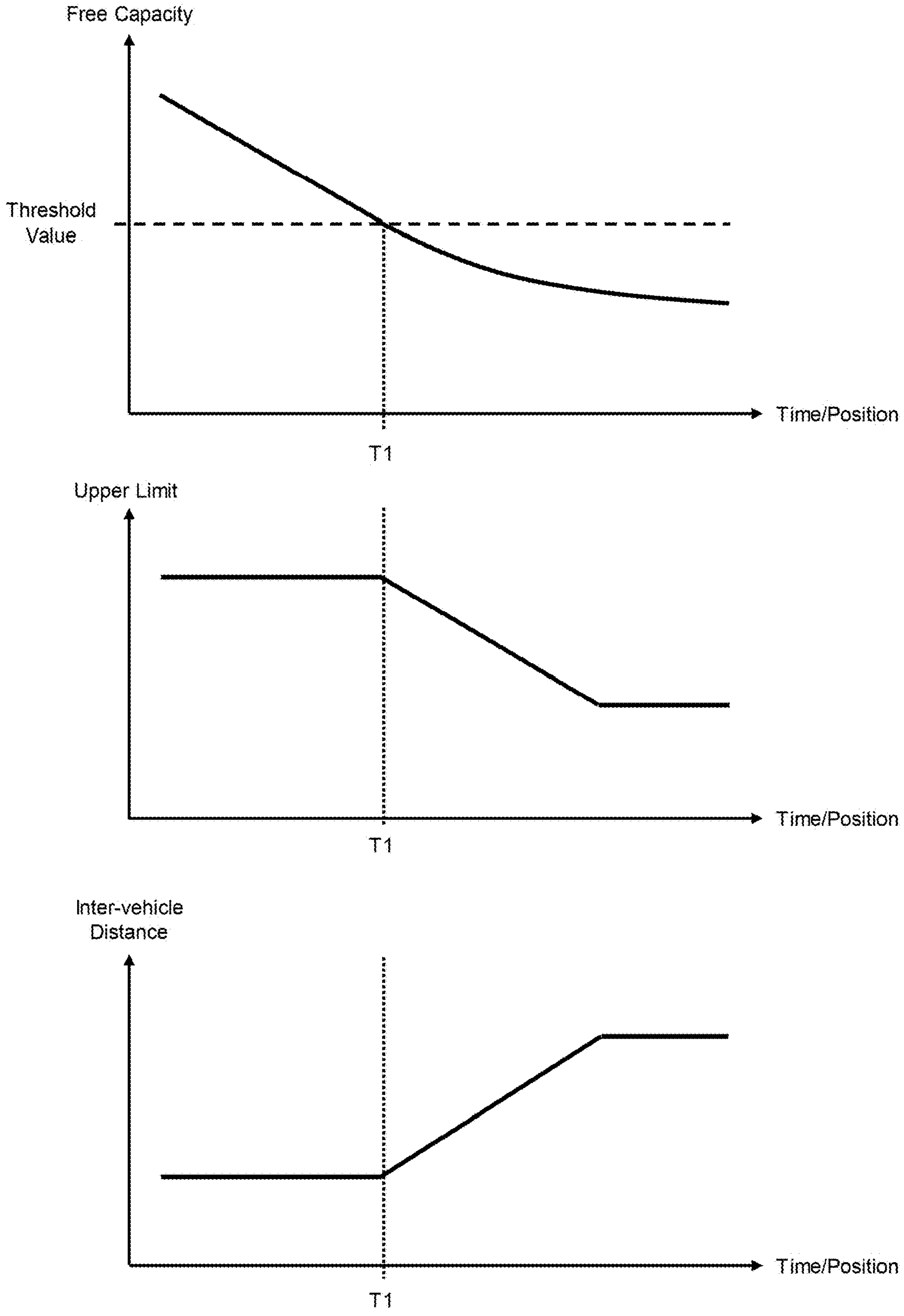
FIG. 5 is a diagram showing a practical example of the automated driving system according to the present embodiment.

FIG. 5 is a diagram showing a practical example of the automated driving system 100 according to the present embodiment. The horizontal axis in FIG. 5 represents time or position. In the practical example shown in FIG. 5, the free capacity is less than the threshold value at T1. When the free capacity is less than the threshold value, the control parameter 122 is adjusted to decrease the upper limit of the acceleration or the steering angular acceleration of the vehicle 1 and to increase the inter-vehicle distance in the automated driving control. By restricting the traveling of the vehicle 1 in this way, the amount of data in the log data LOG to be stored is suppressed, and the decrease in the free capacity of the storage device 120 can be slowed down as shown in FIG. 5.

What is claimed is:

1. An automated driving system comprising:

processing circuitry configured to perform automated driving control of a vehicle in accordance with a control parameter; and one or more storage devices, wherein the processing circuitry is further configured to execute:

storing log data related to the automated driving control in the one or more storage devices while performing the automated driving control; and when an event occurs that causes a free capacity of the one or more storage devices to be less than a threshold value, adjusting the control parameter to restrict traveling of the vehicle.

2. The automated driving system according to claim 1, wherein the control parameter includes a parameter that defines an upper limit of an acceleration or a steering angular acceleration of the vehicle, and the adjusting the control parameter includes decreasing the upper limit depending on the free capacity.

3. The automated driving system according to claim 1, wherein the control parameter includes a parameter that defines a maximum vehicle speed of the vehicle, and the adjusting the control parameter includes decreasing the maximum vehicle speed depending on the free capacity.

4. The automated driving system according to claim 1, wherein the control parameter includes a parameter that defines an inter-vehicle distance in the automated driving control, and the adjusting the control parameter includes increasing the inter-vehicle distance depending on the free capacity.

5. The automated driving system according to claim 1, wherein the processing circuitry is further configured to execute:

performing a recognition process based on a predetermined rule group by inputting a sensor detection information obtained via a sensor into a model.

6. The automated driving system according to claim 5, wherein the processing circuitry is further configured to execute:

receiving a recognition result information output from the model or generated based on the output from the model; and performing a planning process by inputting the recognition result information into the model.

7. The automated driving system according to claim 1, wherein the processing circuitry is further configured to execute:

performing a recognition process based on a machine learning model by inputting a sensor detection information obtained via a sensor into a model.

8. The automated driving system according to claim 7, wherein the processing circuitry is further configured to execute:

receiving a recognition result information output from the model or generated based on the output from the model; and performing a planning process by inputting the recognition result information into the model.

9. The automated driving system according to claim 1, wherein the event is, in the automated driving control, at least one of a control to avoid an object, to operate a collision avoidance system, to overtake a preceding vehicle, or perform a lane change.

* * * * *